(12) United States Patent
Sawasaki et al.

(10) Patent No.: US 7,924,372 B2
(45) Date of Patent: Apr. 12, 2011

(54) SUBSTRATE FOR LIQUID CRYSTAL DISPLAY DEVICE AND LIQUID CRYSTAL DISPLAY DEVICE INCLUDING THE SAME

(75) Inventors: Manabu Sawasaki, Kanagawa (JP); Takashi Takagi, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 467 days.

(21) Appl. No.: 11/915,362

(22) PCT Filed: May 22, 2006

(86) PCT No.: PCT/JP2006/310163
§ 371 (c)(1),
(2), (4) Date: Nov. 23, 2007

(87) PCT Pub. No.: WO2006/129512
PCT Pub. Date: Dec. 7, 2006

(65) Prior Publication Data
US 2009/0109382 A1  Apr. 30, 2009

(30) Foreign Application Priority Data
May 30, 2005  (JP) ................. 2005-158058

(51) Int. Cl.
*G02F 1/1335* (2006.01)
*G02F 1/1339* (2006.01)
(52) U.S. Cl. ........................ 349/106; 349/156
(58) Field of Classification Search .......... 349/106–109, 349/155–157
See application file for complete search history.

(56) References Cited

U.S. PATENT DOCUMENTS

| 2002/0075441 A1* | 6/2002 | Fujimori et al. ............. 349/155 |
| 2003/0071956 A1 | 4/2003 | Sasaki et al. |
| 2003/0128309 A1 | 7/2003 | Yamada |
| 2005/0099577 A1 | 5/2005 | Lee et al. |
| 2005/0110922 A1* | 5/2005 | Lee et al. ................. 349/106 |

FOREIGN PATENT DOCUMENTS

| JP | 2002-116534 | 4/2002 |
| JP | 2002-148633 | 5/2002 |
| JP | 2002-333628 | 11/2002 |
| JP | 2003-121859 | 4/2003 |
| JP | 2003-195027 | 7/2003 |

OTHER PUBLICATIONS

International Search Report mailed Jun. 27, 2006.

* cited by examiner

*Primary Examiner* — David Nelms
*Assistant Examiner* — David Y Chung
(74) *Attorney, Agent, or Firm* — Nixon & Vanderhye P.C.

(57) ABSTRACT

To provide a liquid crystal display device having excellent display quality and a substrate to be used for such liquid crystal display device. A liquid crystal display device is provided with a pair of substrates; a liquid crystal sealed between the substrates, CF resin layers formed in a display area on the substrate; and a structure for sustaining a cell gap between the substrates in the display area. The structure is provided with a resin spacer layer occupying 90% or more of the volume of an organic member constituting the structure.

5 Claims, 12 Drawing Sheets

FIG.9
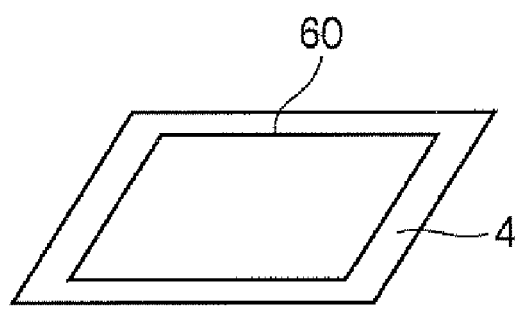
(a)
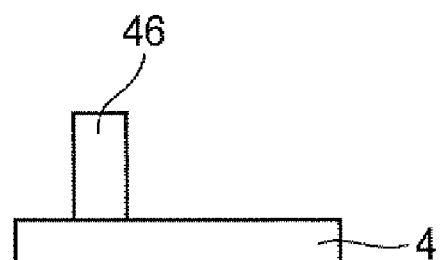
(b)
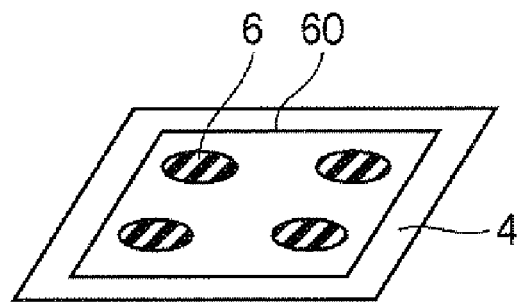
(c)
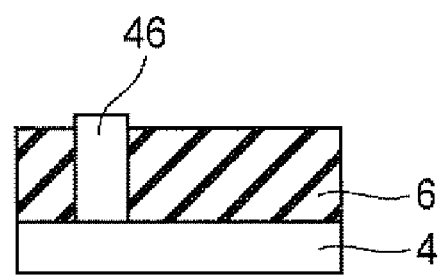
(d)
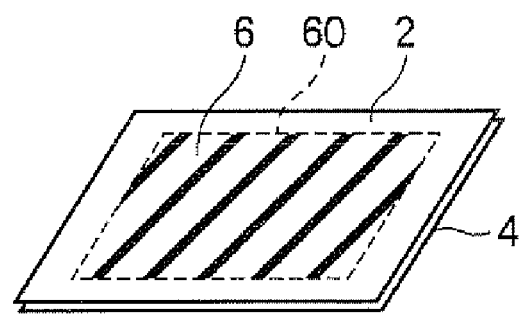
(e)
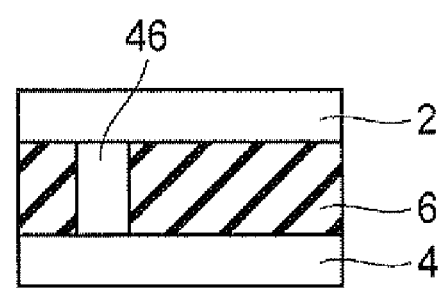
(f)

SUBSTRATE FOR LIQUID CRYSTAL DISPLAY DEVICE AND LIQUID CRYSTAL DISPLAY DEVICE INCLUDING THE SAME

This application is the U.S. National Phase of International Application No. PCT/JP2006/310163 filed 22 May. 2006 which designated the U.S. and claims priority to JP 2005-158058 filed 30 May. 2005, the entire contents of each of which are hereby incorporated by reference.

TECHNICAL FIELD

The present invention relates to a substrate for a liquid crystal display device and a liquid crystal display device including the same.

BACKGROUND ART

In general, a liquid crystal display device has two substrates each having transparent electrodes and a liquid crystal sandwiched between the substrates. The liquid crystal display device is enabled for display in a desired manner by applying a predetermined voltage between the transparent electrodes to drive the liquid crystal and to thereby control light transmittance at each pixel. Recently, there is increasing demand for liquid crystal display devices, which has diversified requirements for liquid crystal display devices. Above all, improvement of display quality is strongly demanded.

Presently, active matrix type liquid crystal display devices having a thin film transistor (TFT) at each pixel as a switching element (TFT-LCDs) have become the main stream of the field. In a TFT-LCD, an interval between the two substrates (cell thickness) is maintained by spherical spacers or bar-shaped spacers made of plastic or glass. Such spacers are normally dispersed on either of the substrates at a spacer dispersing step before the substrates are combined. Thereafter, the two substrates are combined and are pressed from the outside such that the cell thickness is maintained at a value similar to the diameter of the spacers.

However, spacers dispersed within a pixel can cause an alignment defect of the liquid crystal and leakage of light. An alignment defect or leakage of light results in a reduction of contrast or glare on the display screen, which degrades display quality. Further, increases in the size of substrates have made it difficult to disperse spacers evenly. When spacers are unevenly dispersed, the cell thickness between the substrates can vary to result in irregularities of luminance. Particularly, in the case of such as an IPS (In-Plane Switching) or MVA (Multi-domain Vertical Alignment) mode liquid crystal display device, variation of luminance in response to variation of the cell thickness is more significant than that in a TN (Twisted Nematic) mode liquid crystal display device. Therefore, especially in the IPS or MVA mode liquid crystal display device, the cell thickness must be controlled to achieve a higher degree of uniformity in order to provide display without luminance irregularities. Further, since the trend toward pixels of higher definition has resulted in a reduction of the area of each pixel, the area occupied by spacers relative to that of pixels has increased, and spacers have now more significant influence on display quality The recent trend toward substrates in greater sizes and pixels of high definition has resulted in the use of pillar spacers (resin spacers) made of a photosensitive resin instead of spherical spacers and bar-shaped spacers. Since pillar spacers are formed at a photolithographic step, they can be disposed in a region that is shielded from light with a light-shielding film (a black matrix (BM)) in an arbitrary disposing density. Therefore, neither alignment defect of the liquid crystal nor leakage of light occurs in pixels, there is no reduction in contrast or occurrence of glare. Further, since pillar spacers can be formed with a uniform thickness (height) compared with irregularity of a particle size in the spherical spacer or the like, control can be performed to obtain a uniform and accurate cell thickness between substrates. Therefore, no luminance irregularity attributable to variation of the cell thickness occurs. As described above, a liquid crystal display device utilizing pillar spacers can achieve display quality higher than those of a liquid crystal display device utilizing spherical spacers or bar-shaped spacers.

The pillar spacer is usually formed on a portion shielded from light by a BM. FIG. 10 is a process sectional view illustrating a manufacturing method of a known color filter (CF) substrate using the pillar spacer. First, as shown in FIG. 10(a), a BM 145 is formed of Cr metal or black resin on the insulating substrate 111 such as glass. Next, as shown in FIG. 10(b), CF resin layers 140R, 140G, and 140B having the colors of red (R), green (G), blue (B), respectively, is sequentially formed by using a pigment-dispersion type colored photosensitive resin and the like. Next, as shown in FIG. 10(c), a common electrode 141 is formed by sputtering a transparent electrode such as ITO. Next, as shown in FIG. 10(d), for example, a negative type photo resist based on acrylic resin is coated on the substrate, and a pillar spacer 146 having a predetermined size is formed on a predetermined position so as to have a predetermined distribution density by using a photolithographic method. Alignment films 151 and 150 are formed on a CF substrate 104 and a TFT substrate 102 in which a pixel electrode 116 is formed for every pixel, respectively, and the layers are processed by rubbing. Then, the both substrates 104 and 102 are assembled to each other and formed vacant cells. Next, a liquid crystal 106 is injected in the vacant cells, so that a liquid crystal display panel as shown in FIG. 11 is manufactured. As shown in FIG. 11, a cell gap between the substrates 104 and 102 is sustained by a structure 148 mainly including the pillar spacer 146 and the CF resin layer 140.

Here, in designing the distribution density of the pillar spacer 146, physical properties such as pressure displacement of a material or plastic deformation amount are important. It is necessary for the pillar spacer 146 to design so as to have both of a soft property for following heat expansion and contraction of the liquid crystal and a hard property for obtaining pressure resistance. For this reason, the pillar spacer 146 is disposed so as to have the distribution density which is usually one per several pixels as shown in FIG. 12.

Specifically, since "the pressure displacement amount per unit area of the pillar spacer" is uniformly designed, it is necessary for this to set to an optimum value on the basis of a cell process design. That is, cell hardness depends on "the pressure displacement per unit area of the pillar spacer" after cell combination. It is necessary for the pillar spacer to be compressed so as to have both of a soft property for following heat expansion and contraction of the liquid crystal and a hard property for undergoing pressure.

When the pillar spacer 146 is too hard, vacuum regions can be formed because the pillar spacer 146 cannot follow a decrease in the volume of the liquid crystal attributable to thermal shrinkage at a low temperature, and bubbles can be generated in such regions. At a liquid crystal filling and sealing step utilizing a dip type vacuum filling process, a panel which has been filled with a liquid crystal is pressed from the outside at a predetermined pressure to eject any extra part of the liquid crystal, whereby the cell thickness is adjusted However, when the pillar spacer 146 is too hard, the pillar spacer 146 cannot be sufficiently shrunk even if they are pressed at the predetermined pressure. Therefore, when the volume of the liquid crystal increases as a result of thermal expansion at a high temperature, the pillar spacer 146 cannot follow the increase in the volume of the liquid crystal. As a result, the liquid crystal is moved toward a lower part of the panel by gravity, and an irregularity is therefore caused by gravity in that the cell thickness becomes greater in the lower part.

When the pillar spacer 146 is too soft, since they undergo a great amount of displacement and also a great amount of plastic deformation in response to a pressure from the outside, an irregularity of the cell thickness can occur.

Recently, as for the method for realizing a decrease in time of the liquid crystal filling, one drop filling (ODF) method for performing simultaneously the substrate assembly and the liquid crystal filling has been used. In the one drop filling method, the cell thickness is determined by a volume of the liquid crystal. For this reason, it is necessary to match height of the pillar spacer 146 to the cell thickness determined by the volume of the liquid crystal. Considering manufacturing precision, it is also necessary to design the pillar spacer 146 so as to make the spacer even more softly.

Patent Document 1: Japanese Unexamined Patent Application Publication No. 2002-333628

Patent Document 2: Japanese Unexamined Patent Application Publication No. 2002-148633

DISCLOSURE OF INVENTION

Problem to be Solved by the Invention

FIG. 13 is a graph illustrating relationship between displacement amount and load that is applied to the structure (pillar spacer (PS) 146 and CF resin layer 140B) mainly made of resin. FIG. 14 is a graph illustrating relationship between the displacement and plastic deformation amount of the structure 148. In the general spacer material as shown in FIGS. 13 and 14, when the displacement increases, the plastic deformation amount also increases, and thus the material becomes weak with respect to the pressure from outside. Additionally, when the displacement amount excessively increases (for example, load of about 150 mN, displacement of about 1.1 µm), fracture of the spacer material is caused by exceeding an elastic deformation limit thereof. Characteristics of these organic materials are a little bit different from each other in accordance with each kind thereof. Recently, an improvement of these characteristics is required, and development thereof has been continued. Generally, fracture or plastic deformation easily occurs in the organic material including a pigment used in a CF resin layer, a resin BM, or the like.

As described above, there is a problem in that it is difficult to manufacture a liquid crystal display device in which no gravity-originated irregularity occurs and no bubble is generated at a low temperature and which exhibits high resistance to pressures from the outside to achieve high display quality.

It is an object of the invention to provide a liquid crystal display device having an excellent display quality and a substrate used for the liquid crystal display device.

Means for Solving the Problem

In order to achieve the object mentioned above, there is provided a liquid crystal display device characterized by including: a pair of substrates; a liquid crystal which is sealed between the pair of substrates; a color separation filter which is formed in a display area of one of the substrates; and a structure which sustains a cell gap between the pair of substrates in the display area, in which the structure is provided with a resin spacer layer which occupies 90% or more of the volume of organic members constituting the structure.

The liquid crystal display device described above is characterized in that the resin spacer layer does not include a pigment.

The liquid crystal display device described above is characterized in that the structure does not include an organic member other than the resin spacer layer.

The liquid crystal display device described above is characterized in that the structure does not include an organic member other than the resin spacer layer and an alignment film.

In order to achieve the object mentioned above, there is also provided a substrate for a liquid crystal display device characterized by including: a transparent substrate which sandwiches a liquid crystal in combination with an opposite substrate provided opposite thereto; a color separation filter which is formed on the transparent substrate; and a resin spacer layer which is formed on the transparent substrate in order to maintain a cell gap in a display area on the opposite substrate and of which an area overlapping other organic films is 50% or less of a total area of the resin spacer layer as viewed in a direction perpendicular to the substrate surfaces.

The substrate for a liquid crystal display device described above is characterized in that the resin spacer layer does not include a pigment.

The substrate for a liquid crystal display device described above is characterized in that the resin spacer layer does not overlap other organic films.

The substrate for a liquid crystal display device described above is characterized in that the substrate further includes a light-shielding film formed of metal under the resin spacer layer.

In order to achieve the object mentioned above, there is also provided a liquid crystal display device including a pair of substrates provided opposite to each other and a liquid crystal sealed between the pair of substrates, characterized in that the above-described substrate for a liquid crystal display is used as either of the pair of substrates.

Effect of the Invention

According to the invention, it is possible to embody a liquid crystal display device having an excellent display quality and a substrate used for the liquid crystal display device.

BEST MODE FOR CARRYING OUT THE INVENTION

A substrate for a liquid crystal display device and a liquid crystal display device including the same according to an embodiment of the invention will be described with reference to FIGS. 1 to 9. FIG. 1 is a diagram illustrating a schematic configuration of a liquid crystal display device according to the embodiment. As shown in FIG. 1, the liquid crystal display device includes a TFT substrate 2 having gate bus lines and drain bus lines which are formed to cross each other with an insulating film interposed therebetween; and TFTs and pixel electrodes which are formed in every pixel. Additionally, the liquid crystal display device includes a CF substrate 4 having CFs and common electrodes formed thereon and disposed so as to be opposed the TFT substrate 2. A liquid crystal 6 (not shown in FIG. 1) is sealed between both of the substrates 2 and 4.

In the TFT substrate 2, there is a connection between a gate bus line driving circuit 80 on which a driver IC for driving a plurality of gate bus lines is mounted and a drain bus line driving circuit 82 on which a driver IC for driving a plurality of drain bus lines is mounted. The driving circuits 80 and 82 are operative to output scan signals and data signals to a predetermined gate bus line or a predetermined drain bus line on the basis of a predetermined signal outputted from a control circuit 84. A polarizer 87 is disposed on a surface of the TFT substrate 2 opposed to the surface thereof on which the TFT elements are formed, and a polarizer 86 is disposed on a surface of the CF substrate 4 opposed to the surface thereof on which the common electrode is formed, the polarizer 86 being in a crossed Nicols relationship with the polarizer 87. A backlight unit 88 is disposed on a surface of the polarizer 87 opposite to the surface thereof facing the TFT substrate 2.

FIG. 2 is a sectional view illustrating a configuration of three pixels in a display area of a liquid crystal display device according to an embodiment of the invention. As shown in FIG. 2, the CF substrate 4 includes a BM 45 formed on a glass substrate 11 and shielding the vicinity of a pixel area from light. The BM 45 is made of a metal membrane such as Cr. A CF resin layer 40 (40R, 40G, or 40B) having any one of R, G, and B colors is formed as a color separation filter on the BM 45 in the pixel area. A common electrode 41 is formed on the CF resin layers 40 throughout the surface of the substrate. A resin spacer layer 46 having a predetermined size and height is formed at a predetermined distribution density on the common electrode 41. The resin spacer layer 46 is made of a resin, which does not include a pigment and disposed on an area in which the CF resin layer 40 is removed on the BM 45. Additionally, the resin spacer layer 46 may be formed on the TFT substrate 2 side. An alignment film 51 is formed throughout the surface of the common electrode 41 and the resin spacer layer 46.

The TFT substrate 2 opposed to the CF substrate 4 includes pixel electrodes 16 formed in every pixel area on a glass substrate 10. An alignment film 50 is formed throughout the surface of the substrate having the pixel electrodes 16 formed thereon. The liquid crystal 6 is sealed between the CF substrate 4 and the TFT substrate 2. A cell gap between the CF substrate 4 and the TFT substrate 2 is sustained by the structure 48.

The structure 48 includes the BM (Cr film) 45, the common electrode 41, the resin spacer layer 46, the alignment films 50 and 51, a silicon nitride film which is not shown, and the like. In these members, organic members are resin spacer layer 46 and alignment films 50 and 51. As compared with the known configuration, the embodiment is characterized in that the structure 48 does not include a CF resin layer or a resin BM and the resin spacer layer 46 occupies 90% or more of the volume of organic members constituting the structure 48. With such a configuration, it is possible to reduce content ratio of materials (such as resin including a pigment), in which fracture or plastic deformation easily occurs in the structure 48.

FIG. 3 is a graph illustrating a relationship between a displacement amount and a load applied to a structure. The horizontal axis of the graph shows the displacement amount (μm), and the vertical axis shows the load (mN). A line a shows a variation of the displacement amount with respect to the load of the structure 48 according to the embodiment, and lines b and c show a variation of a displacement amount with respect to a load of the known structure 148 according to the embodiment. Here, the known structure 148 mainly includes a resin spacer layer and a CF resin layer, and the resin spacer layer occupies less than 90% of volume of organic members constituting the structure 148. FIG. 4 is a graph illustrating a relationship between a displacement and a plastic deformation amount of the structure. A line d shows the plastic deformation amount with respect to the displacement amount of the structure 48 according to the embodiment, and a line e shows a plastic deformation amount with respect to a displacement amount of the known structure 148. As shown in FIGS. 3 and 4, the structure 48 according to the embodiment is configured to have a small plastic deformation amount and a small displacement amount with respect to a load as compared the known structure 148. In the embodiment as described above, the resin spacer layer 46 occupies 90% or more of the volume of organic members constituting the structure 48, thereby improving spacer characteristics such as pressure resistance.

When the resin spacer layer 46 is formed on the CF substrate 4, an overlapping area between the resin spacer layer 46 and other organic films (particularly, CF resin layer) is 50% or less (preferably, 0%) of a total area as viewed in perpendicular to the substrate surfaces, thereby obtaining the same advantages as described above.

Hereinafter, referring to examples, a substrate for a liquid crystal display device and a liquid crystal display device including the same according to the embodiment will be described in further detail.

EXAMPLE 1

An example of forming the resin spacer layer 46 on the CF substrate 4 side will be described. FIG. 5 is a diagram illustrating a configuration of a manufactured CF substrate 4, and FIGS. 6(*a*) to (*d*) are process sectional views of a portion cut along the line A-A in FIG. 5. First, a low-reflective Cr film (a film thickness of 0.2 μm) is coated on the transparent glass substrate 11 illustrated in FIG. 6(*a*). Next, a resist mask is formed by coating a photo resist thereon, exposing and developing the photo resist. The Cr film is etched by using the resist mask, and then the resist mask is removed, whereby the BM 45 is formed as shown in FIG. 6(*a*).

Next, as shown in FIG. 6(*b*), an R resist (a film thickness of 1.8 μm) of a photosensitive pigment dispersion type is coated and patterned, and then a CF resin layer 40R is formed on an R pixel portion. Next, a G resist (a film thickness of 1.8 μm) of a photosensitive pigment dispersion type is coated and patterned, and then a CF resin layer 40G is formed on a G pixel portion. Next, a B resist (a film thickness of 1.8 μm) of a photosensitive pigment dispersion type is coated and patterned, and then a CF resin layer 40B is formed on a B pixel portion. In the processes of this example, since the resin spacer layer 46 is formed on a part of the B pixel, the CF (B resist in this example) resist preferably does not remain on a presumptive spacer-forming portion 55.

Next, as shown in FIG. 6(*c*), the common electrode 41 is formed, by coating ITO film (a film thickness of 150 nm) as transparent electrodes.

Next, as shown in FIG. 6(*d*), a negative photo resist based on acrylic resin is coated on the common electrode 41. The resist does not include a pigment. At this time, the resist on the CF resin layer 40 has a film thickness of 4.0 μm, and the resist on the presumptive spacer-forming portion 55 in which the CF resin layer 40 does not exist has a film thickness of 5.6 μm. Continuously, the resin spacer layer 46 is formed on the presumptive spacer-forming portion 55 by patterning the resist. Through the processes, the CP substrate 4 as shown in FIG. 5 is manufactured.

A structure 48' of the CF substrate 4 side includes the low-reflective Cr film (an inorganic material), the ITO film (an inorganic material), and the resin spacer layer 46 (an organic material). The resin spacer layer 46 does not overlaps other organic films (particularly, the CF resin layer 40) as viewed in perpendicular to the substrate surface.

The structure 48' has characteristics as shown by the line a of FIG. 3 and the line d of FIG. 4. In the structure 48', the plastic deformation amount obtained under the same displacement amount was smaller than that obtainable by a known structure in which the resin spacer layer is formed on the CF resin layer, and fracture did not occur under the displacement amount in which fracture did occur in the known structure.

Here, the resin spacer layer 46 is configured so as not to overlap other organic films as described above, but a part of the resin spacer layer 46 may be configured so as to overlap the CF resin layer 40 in consideration of an arrangement space of the resin spacer layer 46 and pattern precision of the CF resin layer 40 as shown in FIG. 7. When an overlapping area between the resin spacer layer 46 and the CF resin layer 40 is 50% or less of an area of the resin spacer layer 46, the same advantages as described above can be expected.

EXAMPLE 2

An alignment film 51 was formed on the surface of the CF substrate 4 according to the example 1, and an alignment film 50 was formed on the surface of the TFT substrate 2 manufactured through predetermined processes. After that, a liquid crystal display device of a TN mode as shown in FIG. 2 was manufactured through processes such as a rubbing process, a seal forming process, an assembly process, a cutting process, a liquid crystal filling process, a sealing process, and a polarizer attachment process.

Since an organic film other than the alignment film 50 is not formed on the TFT substrate 2 side of the manufactured liquid crystal display device, the structure 48 has a structure not including organic materials other than the resin spacer layer 46 and the alignment films 50 and 51. The alignment films 50 and 51 have a very small film thickness of about 0.1 μm, and the films have almost no influence on the characteristics of the structure 48. For this reason, the structure 48 had characteristics as shown by the line a of FIG. 3 and the line d of FIG. 4. Since the plastic deformation amount with respect to the displacement of the structure 48 is small and the fracture hardly occurs, the liquid crystal display device having an improved pressure resistance was obtained. Additionally, in the example, the resin spacer layer 46 was formed on the CF substrate 4 side, but the resin spacer layer 46 may be formed on the TFT substrate 2 side.

EXAMPLE 3

An example of applying the embodiment to a liquid crystal display device of MVA mode will be described. FIG. 8 shows a sectional configuration of a liquid crystal display device according to the example. As shown in FIG. 8, a linear protrusion 54 is formed as an alignment regulating structure for regulating an alignment direction of the liquid crystal 6 on the CF substrate 4. A slit (in which the ITO film is removed) 52 is formed as an alignment regulating structure on the TFT substrate 2. For example, the liquid crystal 6 has a negative dielectric anisotropy. The structure 48 has a structure not including organic materials other than the resin spacer layer 46 and the alignment film 50 and 51.

Next, by using an ODF method in the liquid crystal filling process, a manufacturing method of the liquid crystal display device according to the example will be described. FIG. 9 is a diagram illustrating a manufacturing method of the liquid crystal display panel using the ODF method. FIGS. 9(*a*), (*c*), and (*e*) are perspective views illustrating a state of the CF substrate 4 in each process, and FIGS. 9(*b*), (*d*), and (*f*) are schematic sectional views illustrating a state of the vicinity of the resin spacer layer 46 in each process. First, the alignment films are formed on the CF substrate 4 having the protrusion 54 formed thereon and the TFT substrate 2 having the slit 52 formed thereon. Next, for example, a photo-curable seal material 60 is coated on the entire periphery of an outer peripheral portion of the CF substrate 4 without discontinuity as shown in FIGS. 9(*a*) and (*b*). Next, a predetermined amount of liquid crystal 6 is dropped on the CF substrate 4 as shown in FIGS. 9(*c*) and (*d*). In addition, FIG. 9(*d*) shows not the liquid crystal 6 in the dropped state but the liquid crystal 6 in the filled state in the process to be described later. Next, the CF substrate 4 and the TFT substrate 2 are assembled together in vacuum, and then the gap between both substrates 4 and 2 is filled with the liquid crystal 6 by applying an atmosphere pressure thereto, as shown in FIGS. 9(*e*) and (*f*). In this process, the cell gap is controlled by a dropping amount of the liquid crystal 6, and the resin spacer layer 46 is in contact with the TFT substrate 2, so that the cell gap is pressed as much as a predetermined displacement amount. After curing the seal material 60, the liquid crystal display panel is completed through the processes such as a panel cutting process and a polarizer attachment process. Then, the liquid crystal display device is completed through a module process and the like. Here, the example of applying the liquid crystal 6 having a negative dielectric anisotropy is described in the example, but a kind of liquid crystal is not particularly limited thereto.

In the embodiment as described above, the structure 48 for sustaining the cell gap of the liquid crystal display device using the color separation filter has a resin spacer layer 46 which occupies 90% or more of the volume of organic members constituting the structure 48. It is preferable that the structure 48 does not include organic materials other than the resin spacer layer 46, or not include organic materials other than the resin spacer layer 46 and the alignment film 50 and 51. With such a configuration, the plastic deformation amount with respect to the displacement of the structure 48 becomes small, and the structure 48 becomes resistive to fracture thereof. Accordingly, it is possible to manufacture with a high yield a liquid crystal display device having a high reliability in that an occurrence of the cell thickness irregularity and the like is obviated by having a high resistance with respect to outer pressure while maintaining a sufficient flexibility.

The invention is not limited to the embodiment mentioned above, and may be modified to various forms.

For example, a transmissive liquid crystal display device is employed as an example in the embodiment, but the invention is not limited to this and the invention is also applicable to the other liquid crystal display devices such as reflective or semi-transmissive liquid crystal display device.

Additionally, a liquid crystal display device in which electrodes are respectively formed on the pair of substrate surfaces opposed to each other is employed as an example in the embodiment, but the invention is not limited to this and the invention is also applicable to liquid crystal display devices of an IPS mode and the like in which electrodes are formed on only one surface of the pair of substrates.

In addition, an active matrix type liquid crystal display device is employed as an example in the embodiment, but the invention is not limited to this and the invention is also applicable to simple matrix type liquid crystal display device.

BRIEF DESCRIPTION OF DRAWINGS

FIG. 9 is a diagram illustrating a manufacturing method of the liquid crystal display device according to the example 3 of the embodiment of the invention.

DESCRIPTION OF THE REFERENCE NUMERALS AND SIGNS

Figure 1:
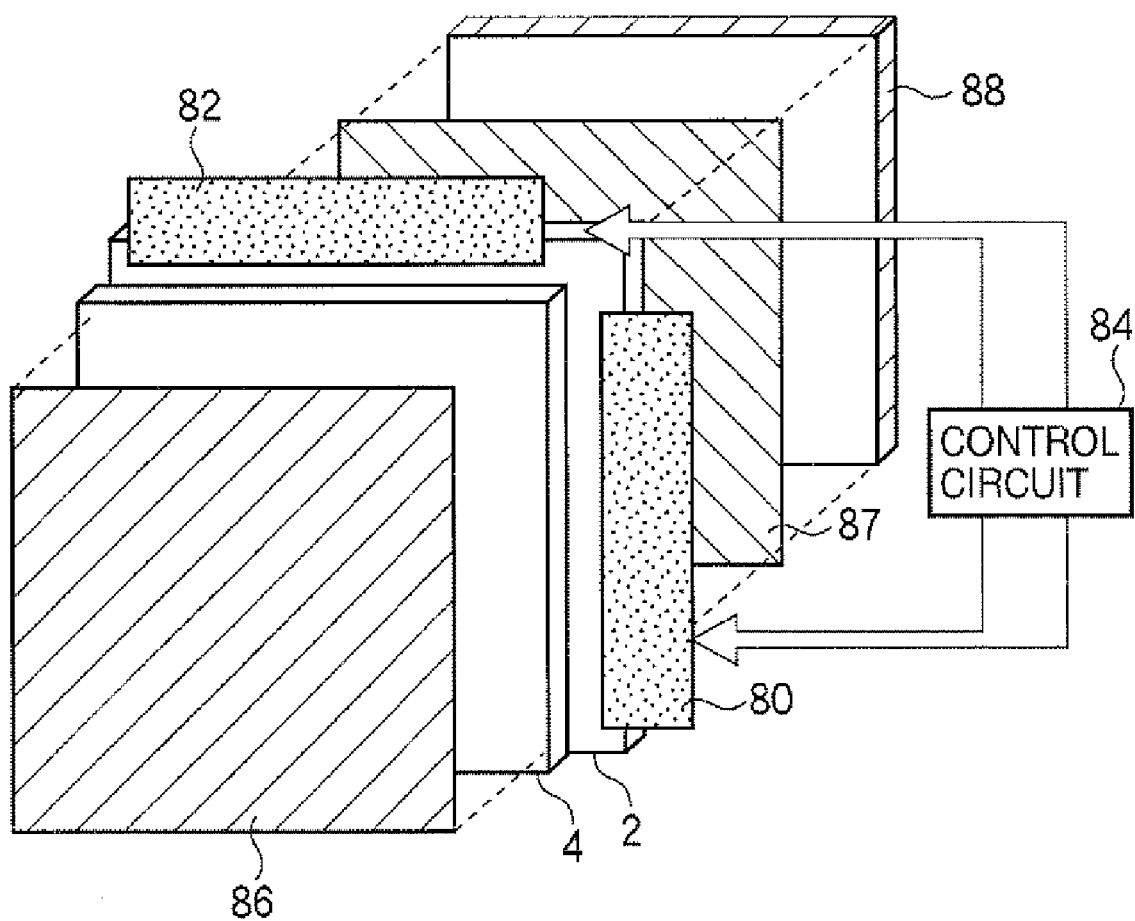
FIG. 1 is a diagram illustrating a schematic configuration of a liquid crystal display device according to an embodiment of the invention.
Figure 2:
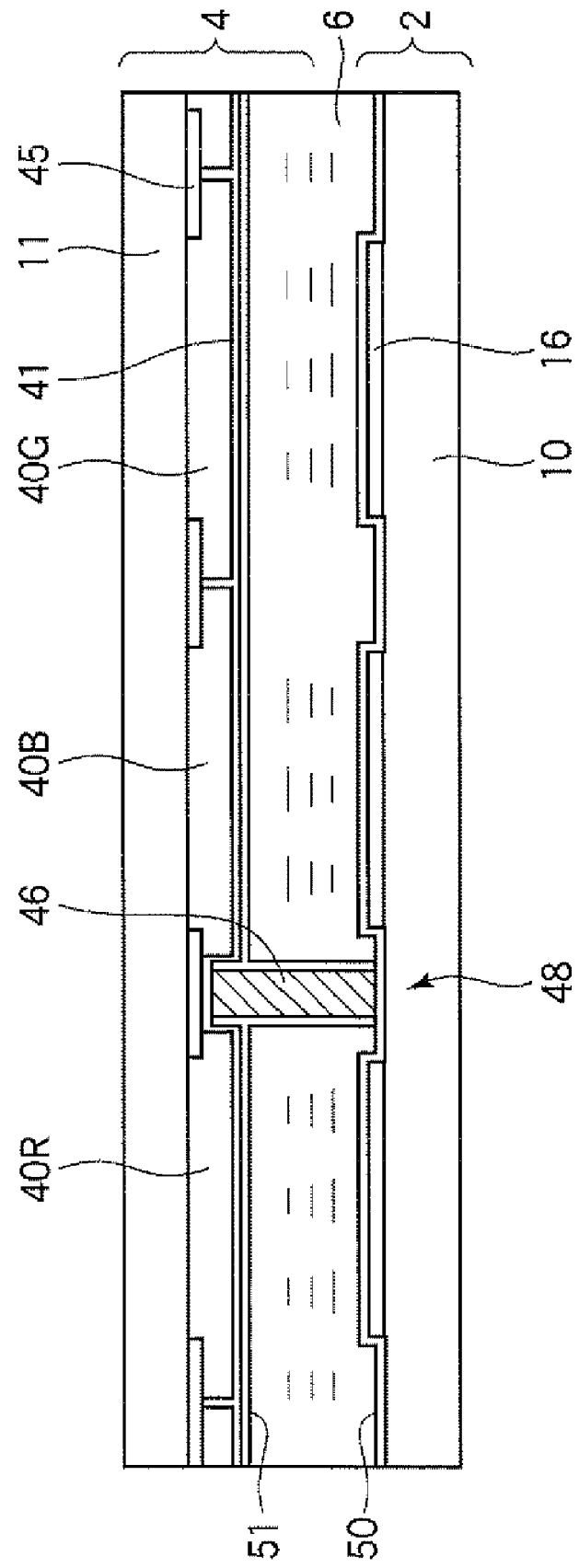
FIG. 2 is a sectional view illustrating a configuration of three pixels of a liquid crystal display device according to an embodiment of the invention.
Figure 3:
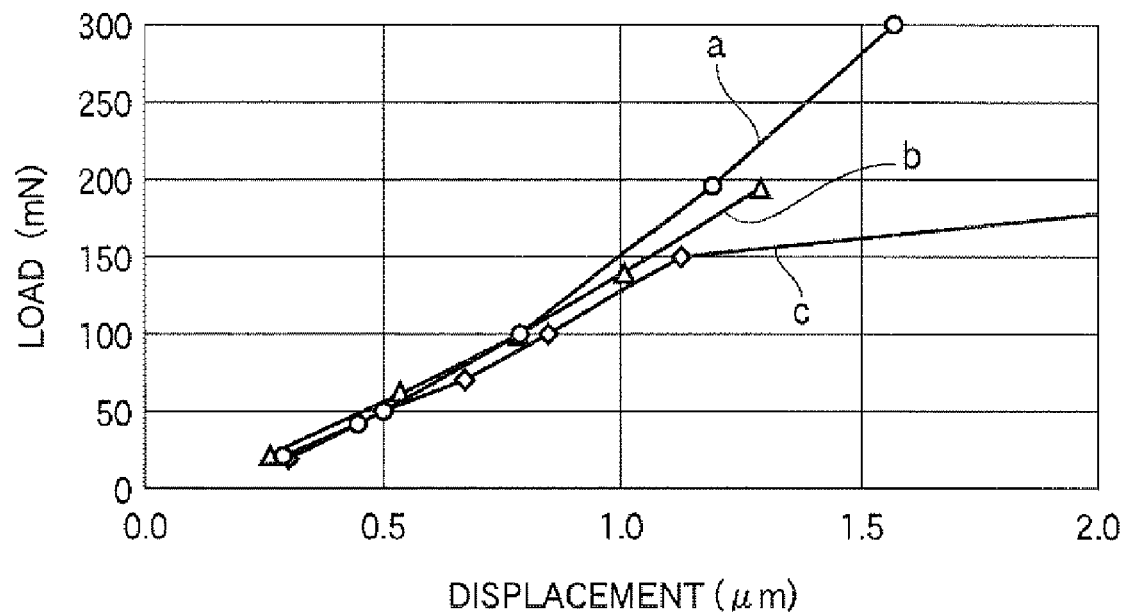
FIG. 3 is a graph illustrating a relationship between a displacement amount and a load applied to a structure.
Figure 4:
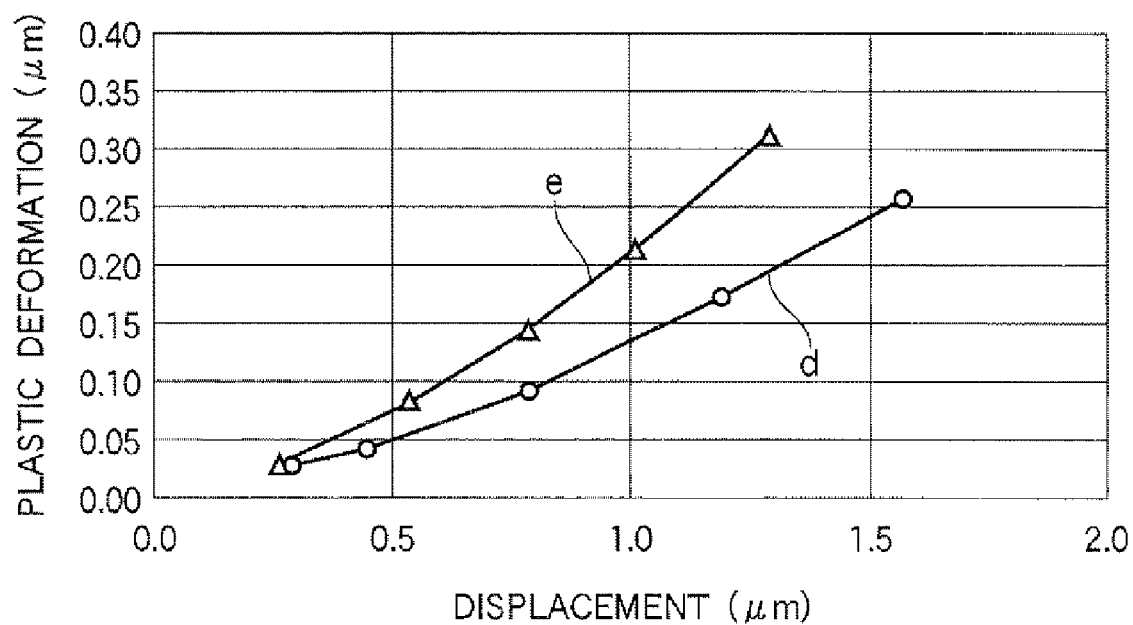
FIG. 4 is a graph illustrating a relationship between a displacement and a plastic deformation amount of the structure.
Figure 5:
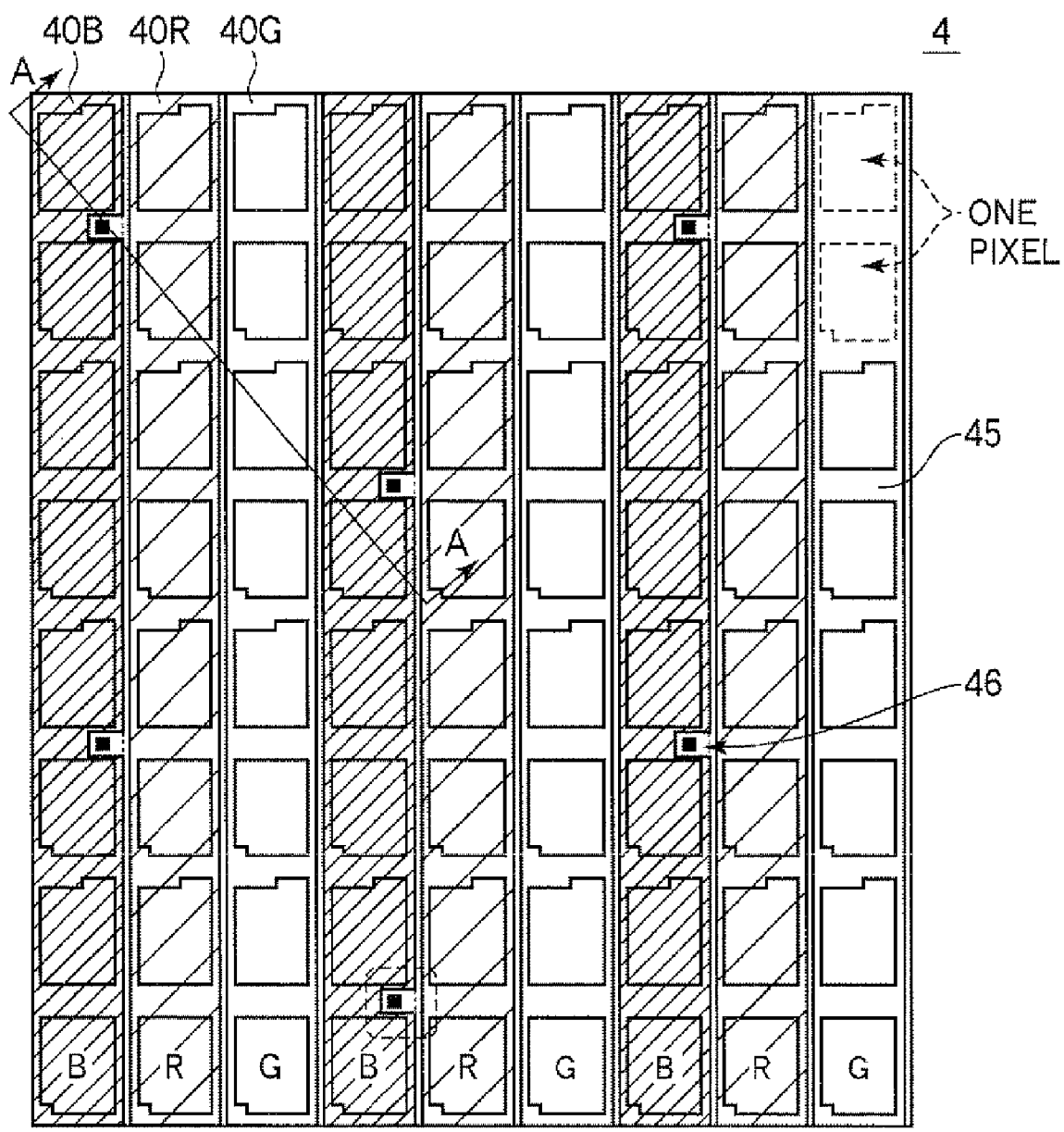
FIG. 5 is a diagram illustrating a configuration of a substrate for a liquid crystal display device according to an example 1 of an embodiment of the invention.
Figure 6:
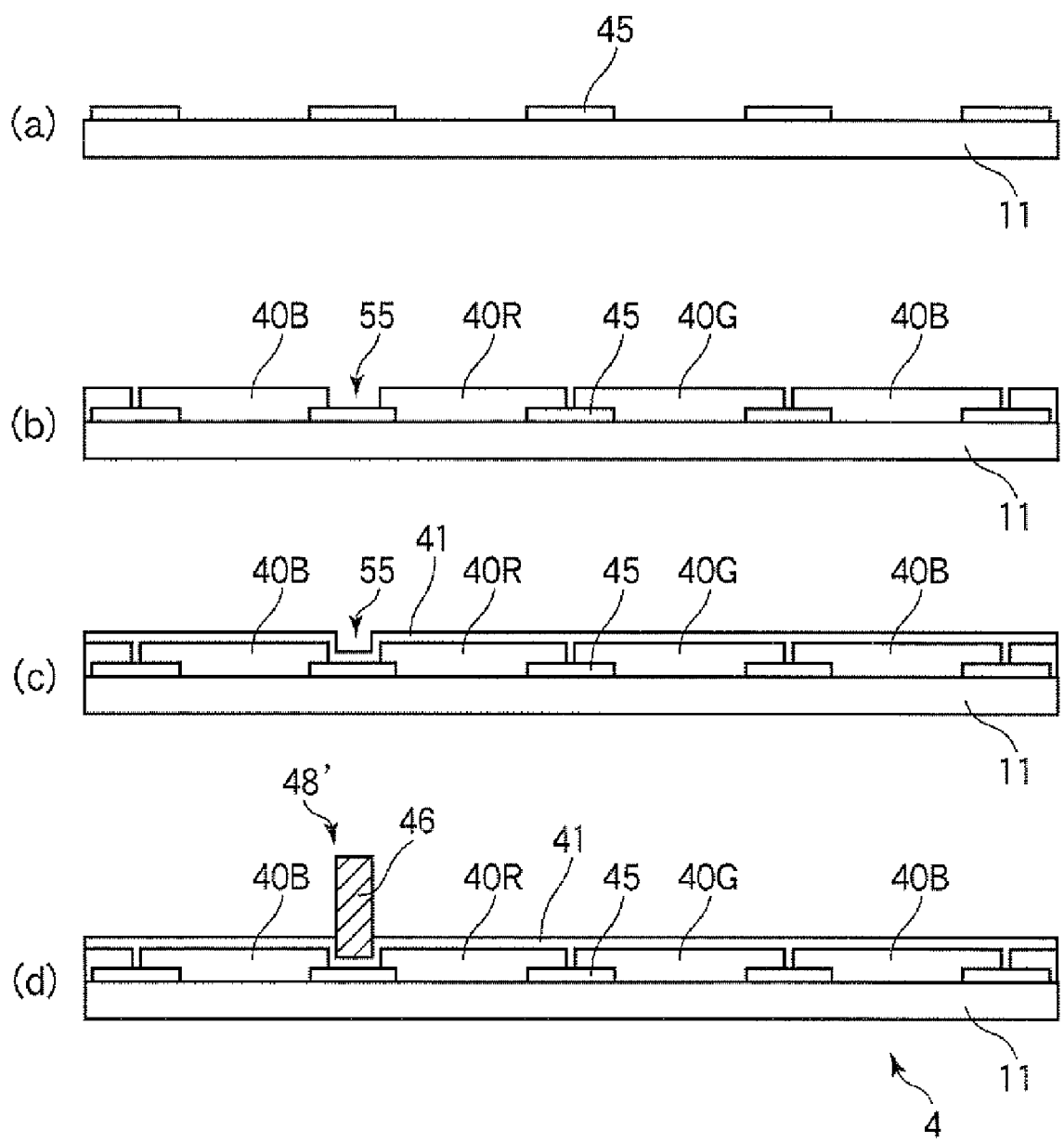
FIG. 6 is a process sectional view illustrating a manufacturing method of a substrate for the liquid crystal display device according to the example 1 of the embodiment of the invention.
Figure 7:
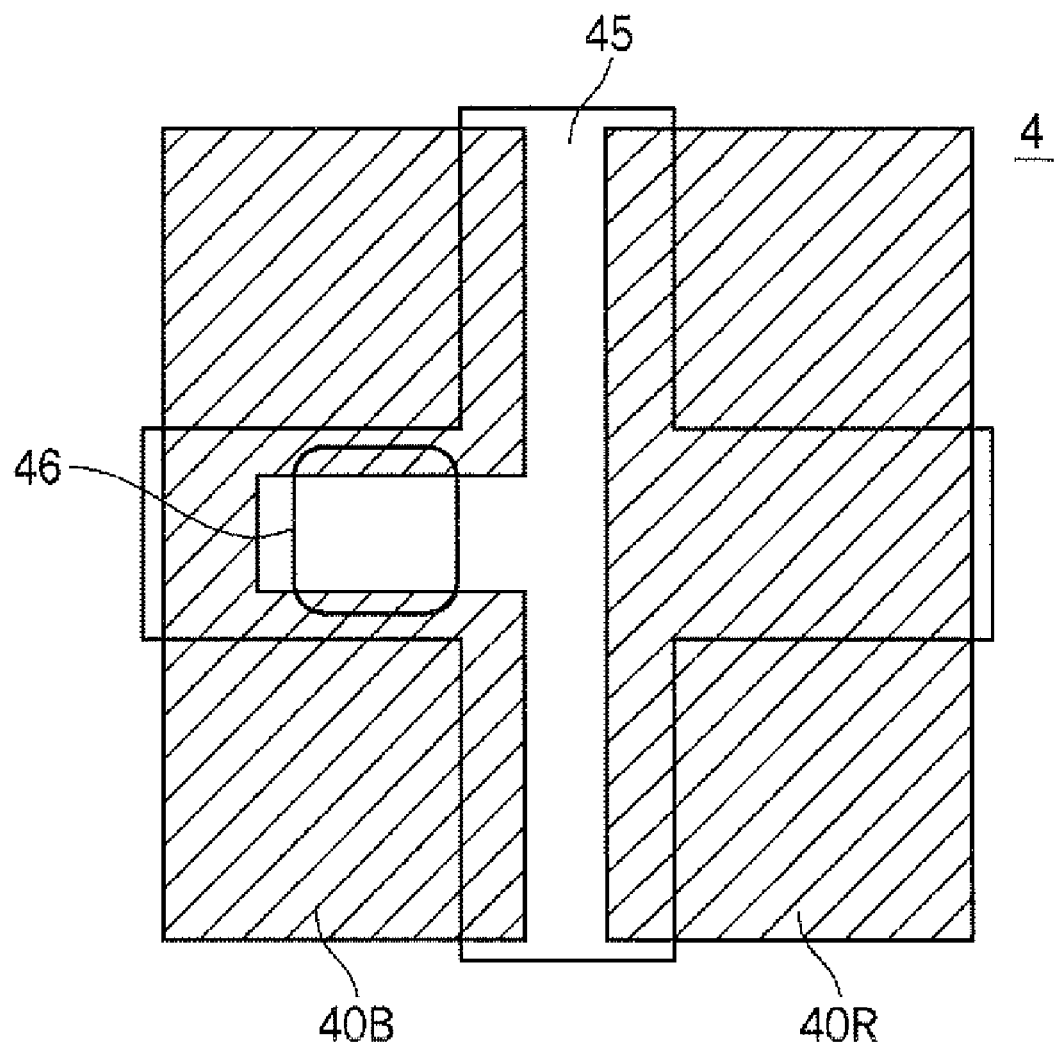
FIG. 7 is a diagram illustrating a modified example of the configuration of the substrate for the liquid crystal display device according to the example 1 of the embodiment of the invention.
Figure 8:
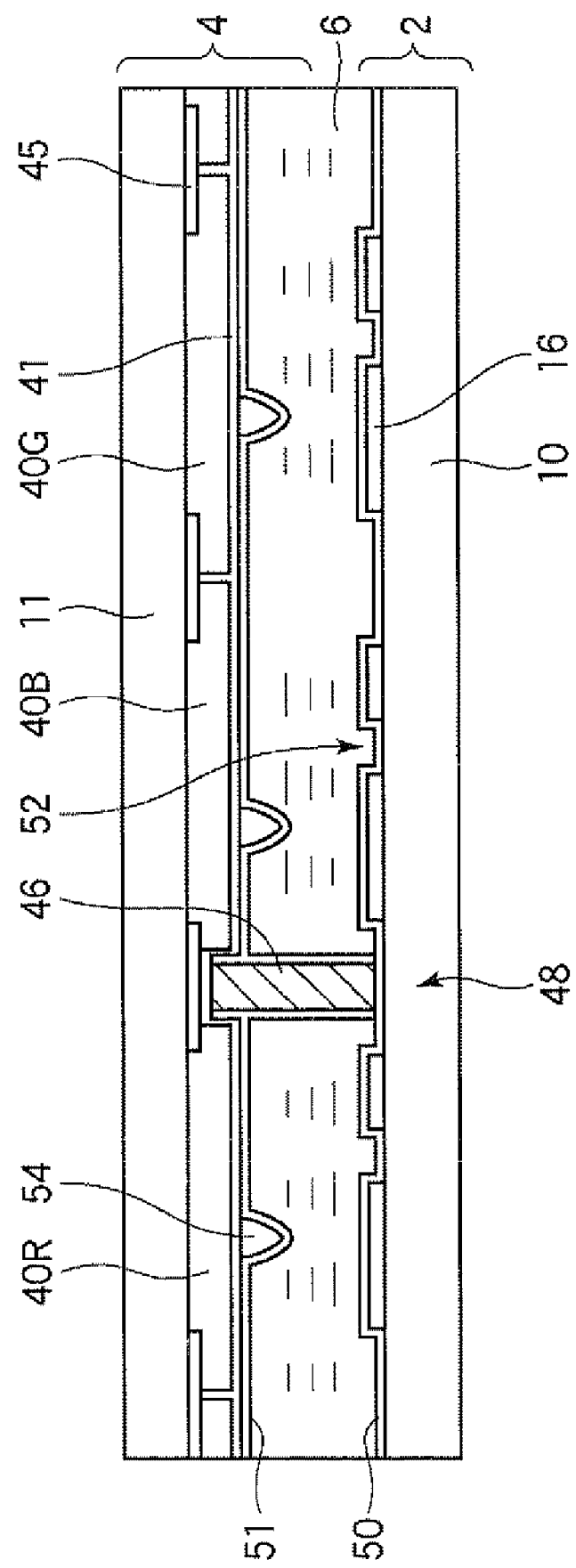
FIG. 8 is a sectional view illustrating a configuration of a liquid crystal display device according to an example 3 of the embodiment of the invention.
Figure 10:
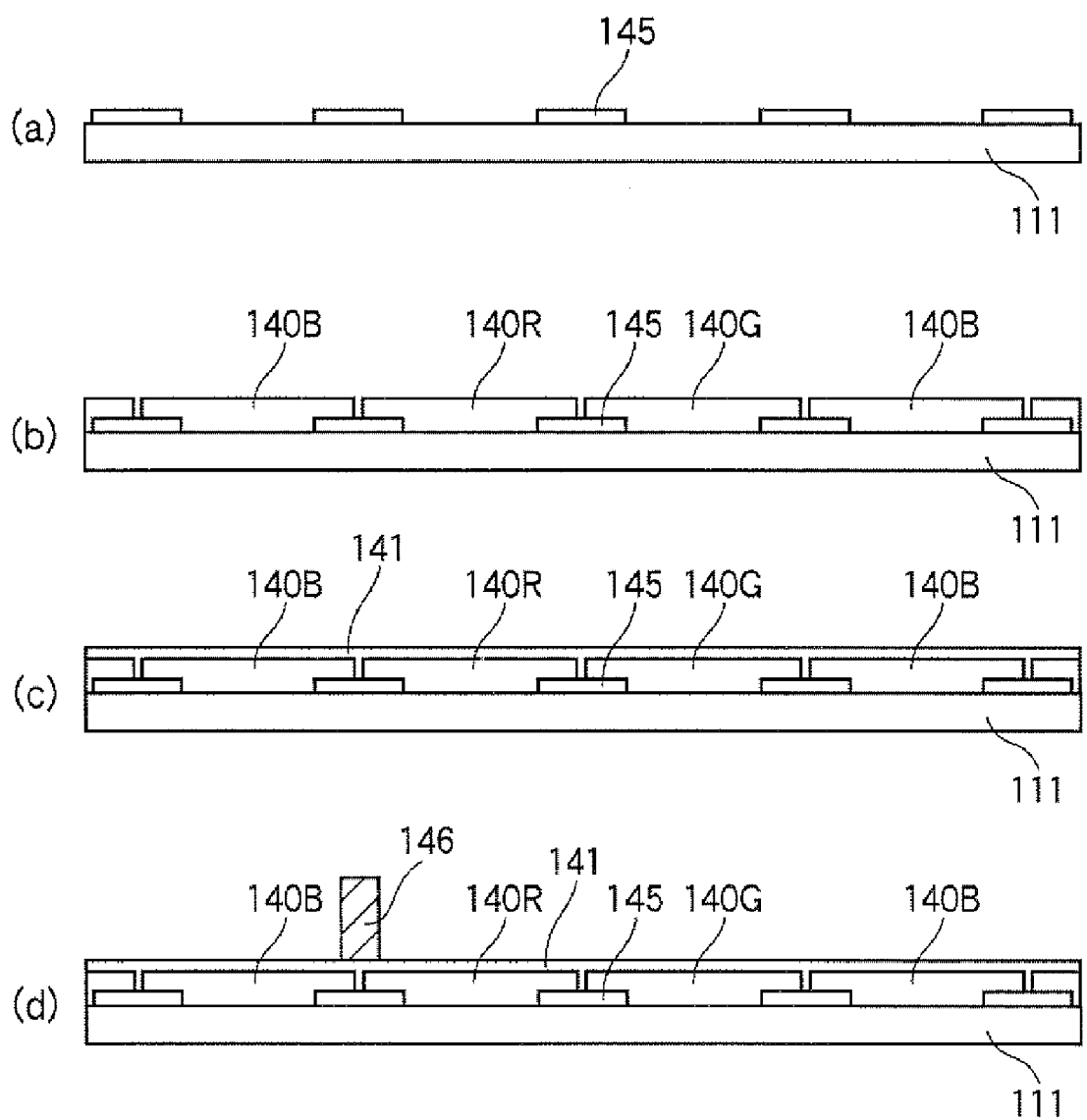
FIG. 10 is a process sectional view illustrating a manufacturing method of a known CF substrate.
Figure 11:
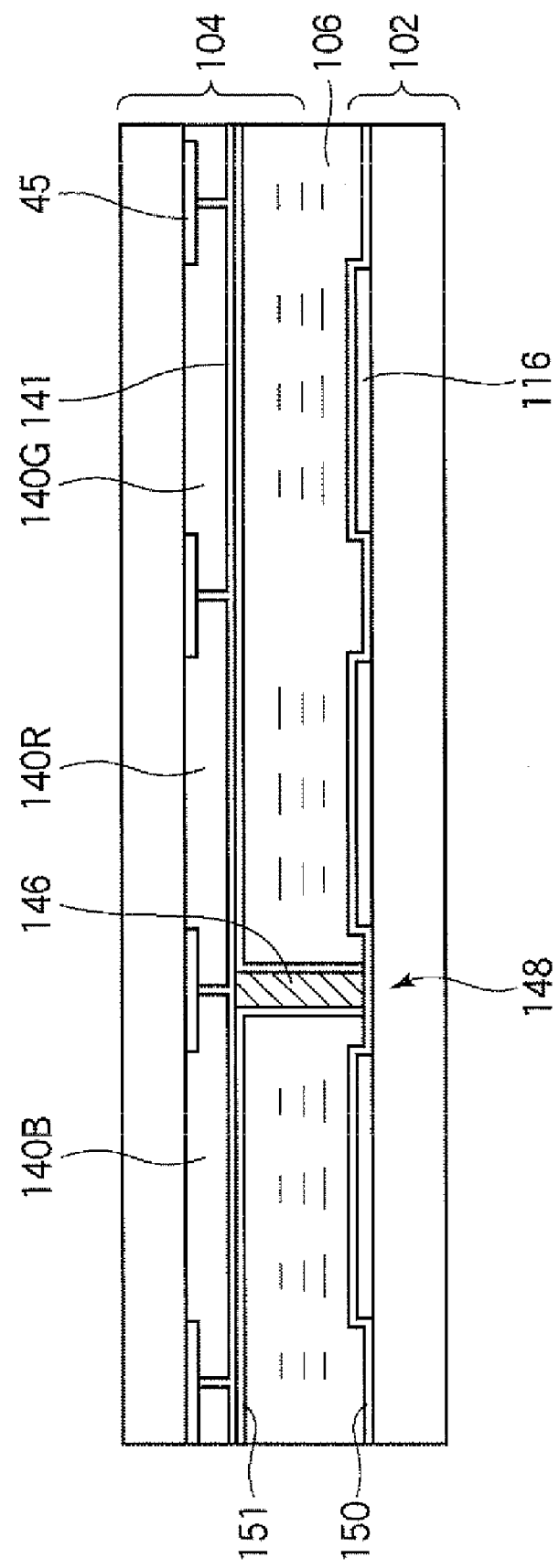
FIG. 11 is a sectional view illustrating a configuration of a known liquid crystal display panel.
Figure 12:
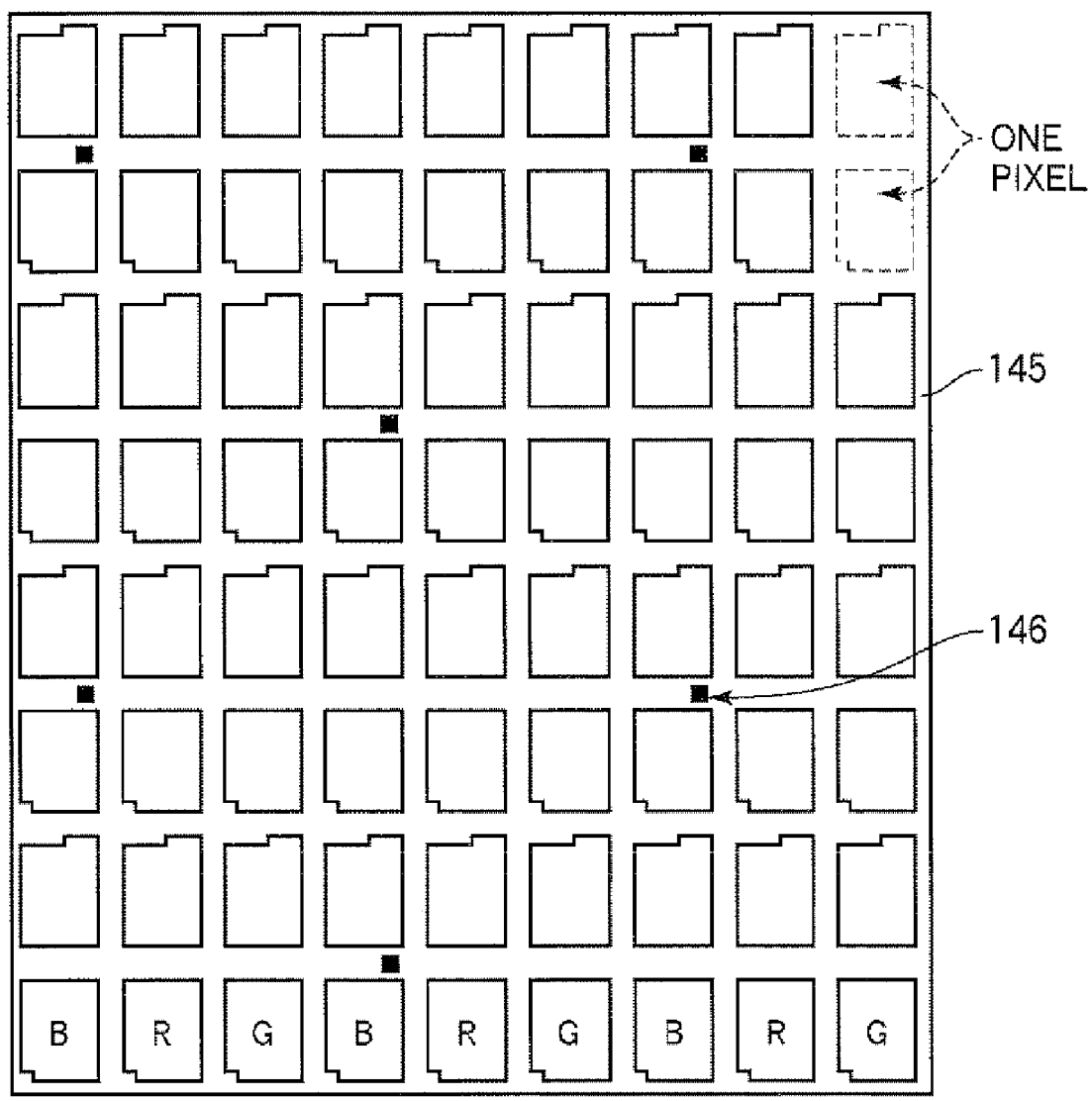
FIG. 12 is a sectional view illustrating a configuration of a known CF substrate.
Figure 13:
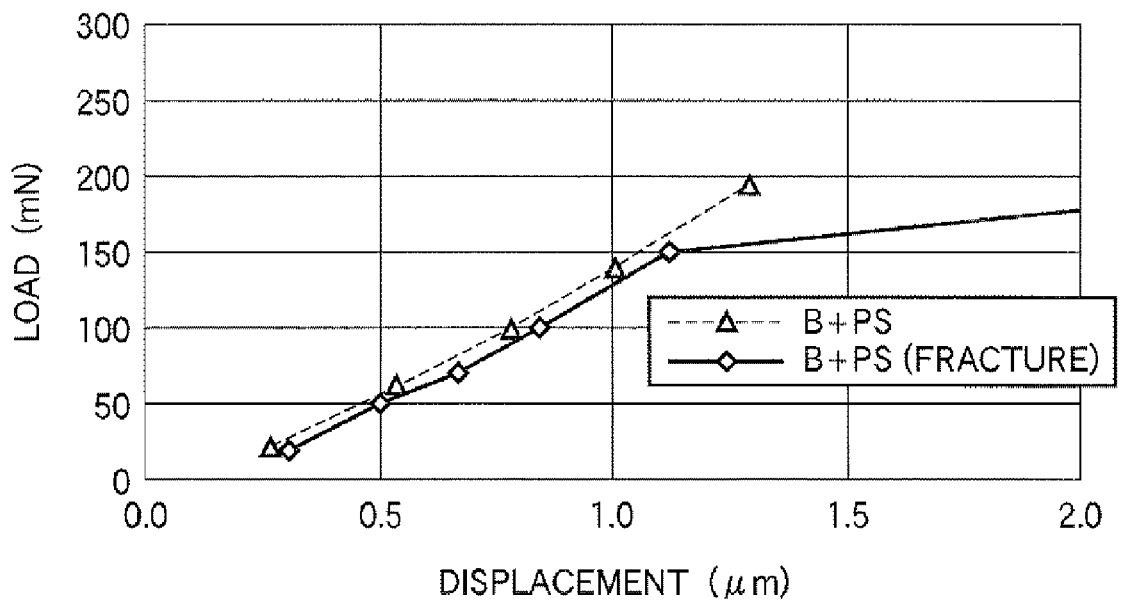
FIG. 13 is a graph illustrating a relationship between displacement amount and load applied to a structure.
Figure 14:
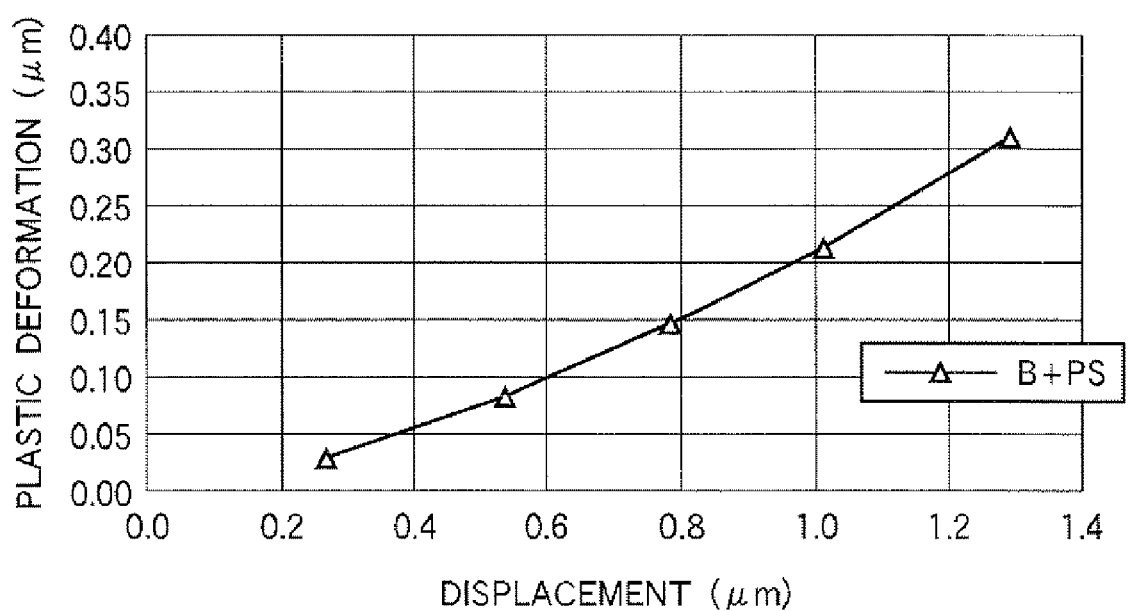
FIG. 14 is a graph illustrating a relationship between displacement and plastic deformation amount of the structure.

2: TFT SUBSTRATE
4: CF SUBSTRATE
10, 11: GLASS SUBSTRATE
16: PIXEL ELECTRODE
40R, 40G, 40B: CF RESIN LAYER
41: COMMON ELECTRODE
45: BM
46; RESIN SPACER LAYER
48: STRUCTURE
50, 51: ALIGNMENT FILM
52: SLIT
54: PROTRUSION
55: PRESUMPTIVE SPACER-FORMING PORTION
60: SEAL MATERIAL
80: GATE BUS LINE DRIVING CIRCUIT
82: DRAIN BUS LINE DRIVING CIRCUIT
84: CONTROL CIRCUIT
86, 87: POLARIZER
88: BACKLIGHT UNIT

The invention claimed is:

1. A substrate for a liquid crystal display device comprising:
   a transparent substrate which sandwiches a liquid crystal in combination with an opposite substrate provided opposite thereto;
   a color separation filter which is formed on the transparent substrate;
   a resin spacer layer which is formed on the transparent substrate in order to maintain a cell gap in a display area between the opposite substrate and the transparent substrate, and of which an area overlapping other organic films is 50% or less of a total area of the resin spacer layer as viewed in a direction perpendicular to the substrate surfaces; and
   wherein an alignment film is the only organic film provided between the resin spacer layer and the substrate that supports TFTs of the liquid crystal display device.

2. The substrate for a liquid crystal display device according to claim 1, wherein the resin spacer layer does not include a pigment.

3. The substrate for a liquid crystal display device according to claim 1, wherein the resin spacer layer does not overlap other organic films.

4. The substrate for a liquid crystal display device according to claim 1, further comprising a light-shielding film formed of metal under the resin spacer layer.

5. A liquid crystal display device comprising a pair of substrates provided opposite to each other and
   a liquid crystal sealed between the pair of substrates, wherein a substrate for a liquid crystal display according to claim 1 is used as either of the pair of substrates.

* * * * *